United States Patent [19]
Suelzle et al.

[11] Patent Number: 5,397,927
[45] Date of Patent: Mar. 14, 1995

[54] ACTIVE FILTER FOR REDUCING NON-FUNDAMENTAL CURRENTS AND VOLTAGES

[75] Inventors: Larry R. Suelzle, Los Altos; Alfred L. Fischer, Costa Mesa, both of Calif.

[73] Assignee: Helionetics, Inc., Irvine, Calif.

[21] Appl. No.: 934,924

[22] Filed: Aug. 25, 1992

[51] Int. Cl.$^6$ ............................ H02M 1/12; H02J 3/01
[52] U.S. Cl. .................................... 307/105; 363/39
[58] Field of Search .................. 307/105, 520, 521; 363/39, 40

[56] References Cited

U.S. PATENT DOCUMENTS

| | | | |
|---|---|---|---|
| 3,531,652 | 9/1970 | Aemmer et al. | 307/105 |
| 3,628,057 | 12/1971 | Mueller | 307/105 |
| 4,020,361 | 4/1977 | Suelzle et al. | 307/106 |
| 4,135,101 | 1/1979 | Young et al. | 307/39 |
| 4,206,398 | 6/1980 | Janning | 324/51 |
| 4,209,757 | 6/1980 | Becker | 307/105 X |
| 4,224,660 | 9/1980 | Mohan | 363/48 |
| 4,812,669 | 3/1989 | Takeda et al. | 307/105 |
| 4,835,411 | 5/1989 | Takeda | 307/105 |
| 4,906,860 | 3/1990 | Asaeda | 307/105 |
| 5,162,983 | 11/1992 | Kumagai | 363/39 |
| 5,172,009 | 12/1992 | Mohan | 307/46 |
| 5,198,746 | 3/1993 | Gyugyi et al. | 323/207 |

FOREIGN PATENT DOCUMENTS

| | | | |
|---|---|---|---|
| 0254073A | 1/1988 | European Pat. Off. | H02M 1/12 |
| 0442492A | 8/1991 | European Pat. Off. | H03H 11/04 |
| 3832922A | 4/1989 | Germany | H02M 1/12 |
| 4123005A | 1/1992 | Germany | H02J 3/01 |
| WO89/06879A | 7/1989 | WIPO | H03H 11/00 |

OTHER PUBLICATIONS

"Active Injection Mode Filter" by L. Suelzle; date unknown.

PCT International Search Report, PCT/US93/07985, Date of the Actual Completion of the International Serach 21 Dec. 1993, Date of Mailing of this International Search Report Jun. 1, 1994, International Searching Authority: European Patent Office.

"A New Injection Method for AC Harmonic Elimination by Active Power Filter" by G. Choe and M. Park, IEEE Transactions on Industrial Electronics, vol. 35, No. 1, Feb. 1988, pp. 141–147.

"A New Approach to Harmonic Compensation in Power Systems—A Combined System of Shunt Passive and Series Active Filters" by F. Z. Peng, H. Akagi and A. Nabae, IEEE Transaction on Industry Applications, vol. 26, No. 6, Nov./Dec. 1990, pp. 983–990.

Primary Examiner—A. D. Pellinen
Assistant Examiner—Fritz M. Fleming
Attorney, Agent, or Firm—Fulwider, Patton, Lee & Utecht

[57] ABSTRACT

An AC power line is monitored for currents and voltages at non-fundamental frequencies (including harmonics). A controlled active filter injects compensating current into the AC power line. The injected compensating current is responsive to both the sensed non-fundamental frequency current and to the sensed non-fundamental frequency voltage residing on the power line. In one embodiment, the controlled active filter comprises a transconductance amplifier which obtains its operating power from a controlled flow of power from the AC power line being monitored.

26 Claims, 6 Drawing Sheets

ACTIVE FILTER FOR REDUCING NON-FUNDAMENTAL CURRENTS AND VOLTAGES

BACKGROUND

This invention relates generally to improvements in power distribution systems and, more particularly, to electrical current injection for more effectively reducing non-fundamental currents and voltages in a power distribution system.

The wide use of nonlinear loads, such as those presented by electronic power converters for computers and other electronic equipment, has increased the harmonic content of the voltage and current waveforms in alternating current (AC) power distribution systems. The problem has become especially acute in large office buildings where large numbers of such electronic equipment are operating thereby causing a corresponding increase in power line harmonics. In some of these buildings, the current distortion levels may reach 80%

Such harmonic currents in conjunction with their associated source impedances produce distortion of the line voltages and these distorted line voltages can cause equipment to malfunction. The electromagnetic fields associated with the harmonic currents can interfere with telephone and other communication systems, and the harmonic currents can also result in overheated conductors in conduits and panel boxes and in overheated distribution transformers. Under nonlinear loading, neutral conductors in three-phase power distribution systems, which normally carry insignificant currents for linear loads, are now carrying currents up to approximately 73% greater than the actual line currents.

Prior systems for controlling or limiting the harmonic currents and the distortion voltages they produce have included: (1) placing limits on the amount of harmonic current that loads are permitted to draw by better load design; (2) using passive filters; (3) adding power line conditioners which effectively isolate loads from the power system; (4) running the generating or distribution system below rated capacity to reduce the source impedance and also reduce losses; (5) using zigzag and phase-shifting transformers; and (6) using active filtering techniques.

The technology exists for substantially reducing the harmonic currents drawn by most offending loads through better load design. However, the requisite additional power components and control circuitry add to manufacturing costs, and the costs of retro-fitting existing equipment, such as the large installed base of personal computers, can be prohibitive. Therefore, this approach is not likely to be implemented in the near future.

In-line and shunt passive filters can be designed and installed to remove harmonics that occur at specific frequencies. Passive filters use capacitors and inductors to shunt unwanted harmonic currents. The use of reactive components can provide effective filtering if properly designed and integrated into the power system. However, passive filters generally operate in a narrow frequency band and have some severe disadvantages which often outweigh the advantages. Such disadvantages include catastrophic failure of filter components when unexpected harmonic currents are experienced, degradation of filter performance when load or power source characteristics change, and degradation of the electrical distribution system due to harmonic resonances created by the passive filter itself.

Power line conditioners which utilize AC-to-DC and DC-to-AC tandem power conversion stages isolate load harmonic currents from the input AC line. To be effective in reducing line-side harmonics, however, the input AC-to-DC conversion circuit must use low harmonic conversion technology. Because this type of power conditioner feeds all the load power through two power conversion stages, the power loss is substantial on a relative basis. The power line conditioner is a very expensive solution if the sole function is the reduction of harmonic currents.

Running the system below rated capacity is also an undesirable approach. The system then would not be used to the full extent of its abilities, thus lost capacity results with the associated loss of efficiency and increase in cost.

Zig-zag connections on the secondary windings of three-phase distribution transformers have been used in an attempt to reduce the flow of third harmonic (and other triple) currents through the transformer into the "up-stream" primary circuits. This method of controlling harmonic currents does not remove non-triple harmonics and is less effective when the third harmonic currents are not balanced between the phases. Excessive power loss in the secondary windings due to harmonic currents remains a consideration. Additionally, zig-zag phase-shifting transformers cannot be used for single-phase circuits.

A phase-shifting transformer which outputs two three-phase voltage sets having thirty degrees of phase shift between them can provide cancellation of fifth and seventh harmonic currents in the upstream power circuit. Best results occur when loads having similar fifth and seventh harmonic currents can be equally divided between the two three-phase outputs. The addition of phase-shifting transformers to existing power distribution installations can be an expensive harmonic current solution. In addition to the cost of installing the transformers, load circuits must be divided and connected through separate distribution circuits. Phase-shift transformers also cannot be used for single-phase circuits.

The use of active current injection for the compensation of harmonic currents was proposed in the early 1970's. In the harmonic current injection filter, an injection power source is connected across the AC power line at a point located between the power source and the load and provides a controlled output current. Current to the load is sensed and analyzed, and the harmonic components are input to the injection power source. The injection power source produces the appropriate input-signal-to-output-current ratio to supply the harmonic currents drawn by the load, and therefore the harmonic currents drawn by the load from the AC power source are ideally reduced to zero.

The conventional current injection filter produces an undesirable response, however, in the case where distortion in the AC voltage source is partially responsible for the existence of distorted currents to the load. Due to the inability of prior current injection filters to determine the source of the distorted load currents, such traditional current injection filters will supply the load with the same harmonic currents that the voltage source was supplying thereby "unloading" the distorted AC voltage source for the harmonic voltages. The distorted voltage source may now produce increased harmonic voltages. Similarly, transient disturbances that are normally damped by the load can become undamped by the action of the traditional current injection filter if it is made responsive to transient currents.

Hence, those concerned with reducing the non-fundamental content in power distribution systems have recognized a need for a more effective filter system; one which can reduce current distortion caused by the load without increasing voltage distortion produced by the voltage source. Additionally, there exists a need for providing such a filter system without undue expense and without disturbing the installed base of existing load equipment. The present invention fulfills these needs.

SUMMARY OF THE INVENTION

Briefly and in general terms, the present invention employs current generating means connected across a power line to provide current into the power line in response to control signals. One control signal is proportional to the current flowing to the load and the other control signal is proportional to the line voltage. Each control signal is filtered to remove the fundamental frequency; e.g. 60 Hz, and is applied to the current generating means. In one embodiment, the control signals are combined and a single switching-mode transconductance amplifier responsive to the control signal combination is used as the current generating means.

The current generating means is controlled by the control signals to inject into the power line a current component proportional to the harmonic and other non-fundamental frequency currents flowing toward the load and a current component proportional to the non-fundamental frequency line voltages but opposite in phase. Because the second component of the injected current is proportional to the non-fundamental frequency line voltages on the power line but is out of phase with them, the current generating means acts as a resistive load on these voltages and power will flow into the current generating means at these non-fundamental frequency voltages thereby loading them and reducing their amplitudes.

In one embodiment, the power flowing into the current generating means as a result of the loading of the non-fundamental frequency voltages counteracts the internal losses of the current generating means and, if the power flowing in exceeds those losses, the excess power is converted to power at the fundamental frequency and supplied back to the AC power line.

Other aspects and advantages of the invention will become apparent from the following detailed description, and the accompanying drawings, illustrating by way of example the features of the invention.

DETAILED DESCRIPTION OF THE PREFERRED EMBODIMENTS

Figure 1:
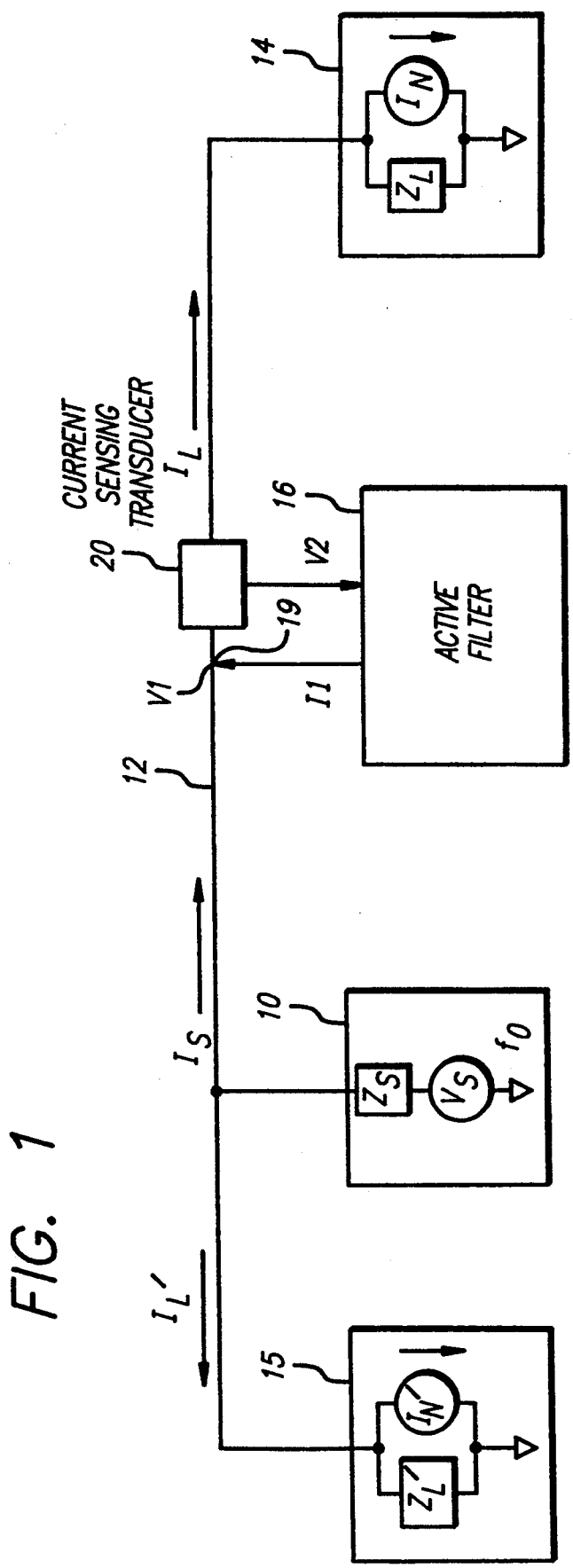
FIG. 1 is a block diagram of an active filter in accordance with the principles of the invention.

Referring now to the drawings with more particularity, wherein like reference numerals are used to indicate like or corresponding elements among the several views, in FIG. 1, an AC power source 10 provides voltage $V_s$ through internal impedance $Z_s$ to AC power line 12. The voltage $V_s$ has a fundamental frequency component $f_o$ and may include non-fundamental frequency components such as harmonics of the fundamental frequency or transient voltages. The voltage V1 on the AC power line 12 is applied to load 14 which may produce nonlinear loading represented by non-fundamental frequency load current source $I_N$. The impedance $Z_L$ of the load is shown in parallel with the load current source $I_N$. Typically, power source 10 also feeds other loads 15 which may also produce nonlinear loading represented by non-fundamental frequency load current source $I_N'$ and impedance $Z_L$.

In the embodiment of FIG. 1, an active filter 16 has two connections with the A C power line 12. The first connection comprises a point 19 where the voltage V1 of the AC power line 12 is sensed and where the injection current I1 is provided to the AC power line 12. The second connection comprises a current sensing transducer 20 which is connected to the AC power line 12 between the load 14 and the point of connection 19 for the injection current.

Figure 2:
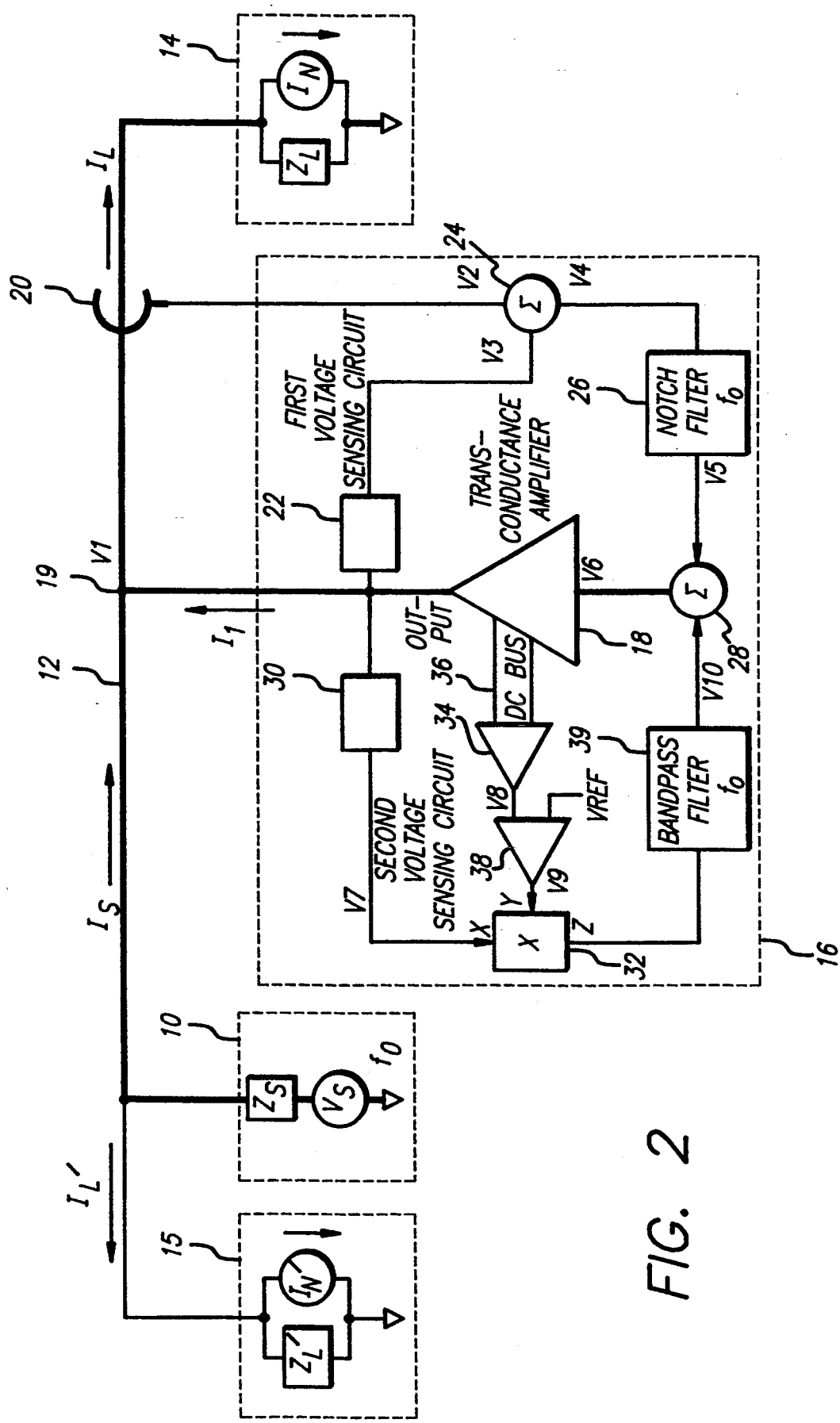
FIG. 2 is an overall block diagram illustrating one embodiment of the present invention.

Referring now to FIG. 2, the current sensing transducer 20 provides a voltage V2 which is proportional to the load current $I_L$ on the AC line 12 drawn by the load 14. A first voltage sensing circuit 22 provides a voltage V3 which is proportional to the voltage V1 on the AC power line 12 sensed at a point 19 but with a phase inversion. In this embodiment, the active filter 16 comprises a hi-directional transconductance amplifier 18 and the first voltage sensing circuit 22 connects to the output of the transconductance amplifier 18. Voltages V2 and V3 are combined in a junction 24 so that the output voltage V4 equals a linear combination of voltages V2 and V3. Voltage V4 is filtered by a notch filter 26 to remove the fundamental frequency component $f_o$. The output voltage V5 of the notch filter 26 is combined with an input power control signal V10 (described below) in a junction 28 to provide an output voltage V6 which is a linear combination of voltages V5 and V10. The transconductance amplifier 18 produces an output injection current II which is proportional to this analog input voltage signal V6. As used herein, a transconductance amplifier is an amplifier which produces a current output in response to a voltage input. In this embodiment, the transconductance amplifier 18 is bi-directional; i.e., power efficiently flows in either direction between its output and its energy storage bus.

In the circuit shown in FIG. 2, the voltage V2 is a current sense control signal and the voltage V3 is a voltage sense control signal. These control signals are filtered by notch filter 26 to remove the fundamental frequency component $f_o$ and are applied to a current source 18 to control that current source to inject a current into the AC power line. Although in FIG. 2, the control signals V2 and V3 have been combined, this has been done in this embodiment to increase efficiency. Only one notch filter and one current source are needed. In another embodiment, the control signals may be separately filtered and may be provided to separate current sources. Each current source would then inject a current to the AC power line responsive to its respective control signal. However the embodiment of FIG. 2 uses only a single filter and a single current source thus lowering the number of parts in the active filter.

In this embodiment, the transconductance amplifier 18 does not require an independent power source or separate connection to the AC power line 12. Instead, it draws any needed power from the AC power line 12 through its output port as is described in more detail below.

A second voltage sensing circuit 30 provides a representative voltage V7 which is also proportional to the voltage V1 on the AC power line 12. Representative voltage V7 is applied to the input port (X) of a gain controller 32, which in this embodiment is an electronic gain controller implemented by an analog multiplier. A sensing amplifier 34 connects to the DC bus 36 of the transconductance amplifier 18 to provide a voltage V8 which is proportional to the DC parameter that relates to the DC energy storage device in the transconductance amplifier 18. When the transconductance amplifier 18 utilizes a voltage-mode switching amplifier for example, the voltage V8 is made proportional to the DC voltage on the amplifier's DC voltage bus capacitor. On the other hand, when the transconductance amplifier 18 utilizes a current-mode switching amplifier, the voltage V8 is made proportional to the DC current in the amplifier's DC current bus inductor.

The voltage V8 is compared to a reference voltage $V_{ref}$ at a comparing amplifier 38 to produce a DC error voltage V9. The error voltage V9 is applied to the controller input (Y) of the gain controller 32 to control the voltage at the output port (Z) of the gain controller 32. The output (Z) of the gain controller 32 is filtered by a band pass filter 39 to remove non-fundamental frequency components and the filtered signal, designated as voltage V10, is applied to the junction 28 to control the transconductance amplifier 18. The voltage $V_{ref}$ is selected so that sufficient power is drawn from the AC power line 12 to maintain the desired DC bus voltage or current to run the transconductance amplifier 18.

The output current I1 of the transconductance amplifier 18 is therefore a combination of three current components. The first current component of I1 is a current proportional to the non-fundamental frequency currents included in the load current $I_L$ flowing toward the load 14. The sensitivity of the current transducer 20 and the voltage-to-current gain of the transconductance amplifier 18 are chosen to make this current component equal to the non-fundamental frequency currents of $I_L$ flowing toward the load 14.

The second current component of I1 is a current proportional to the non-fundamental frequency voltage on the AC power line 12 but opposite in phase. The sensitivity of the first voltage sensing circuit 22 is chosen to provide a desired ratio of current to voltage, so that the output of the transconductance amplifier 18 functions as a resistive load on non-fundamental frequency voltage components on the AC power line 12. Power will flow into the transconductance amplifier 18 for those voltage components and will be available to support at least a portion of the internal losses of the transconductance amplifier 18.

The third current component of I1 is a current proportional to the fundamental frequency component of the voltage V1 on the AC power line 12. The reference voltage $V_{ref}$ applied to the comparator amplifier 38 is chosen so that a flow of power from the AC power line 12 to the transconductance amplifier 18 is produced to maintain the DC energy storage of the transconductance amplifier 18 at the appropriate level, thus compensating for power losses within that device 18. This flow of power is typically only a few percent of the apparent power (I1×V1) produced by the transconductance amplifier 18.

Figure 3A:
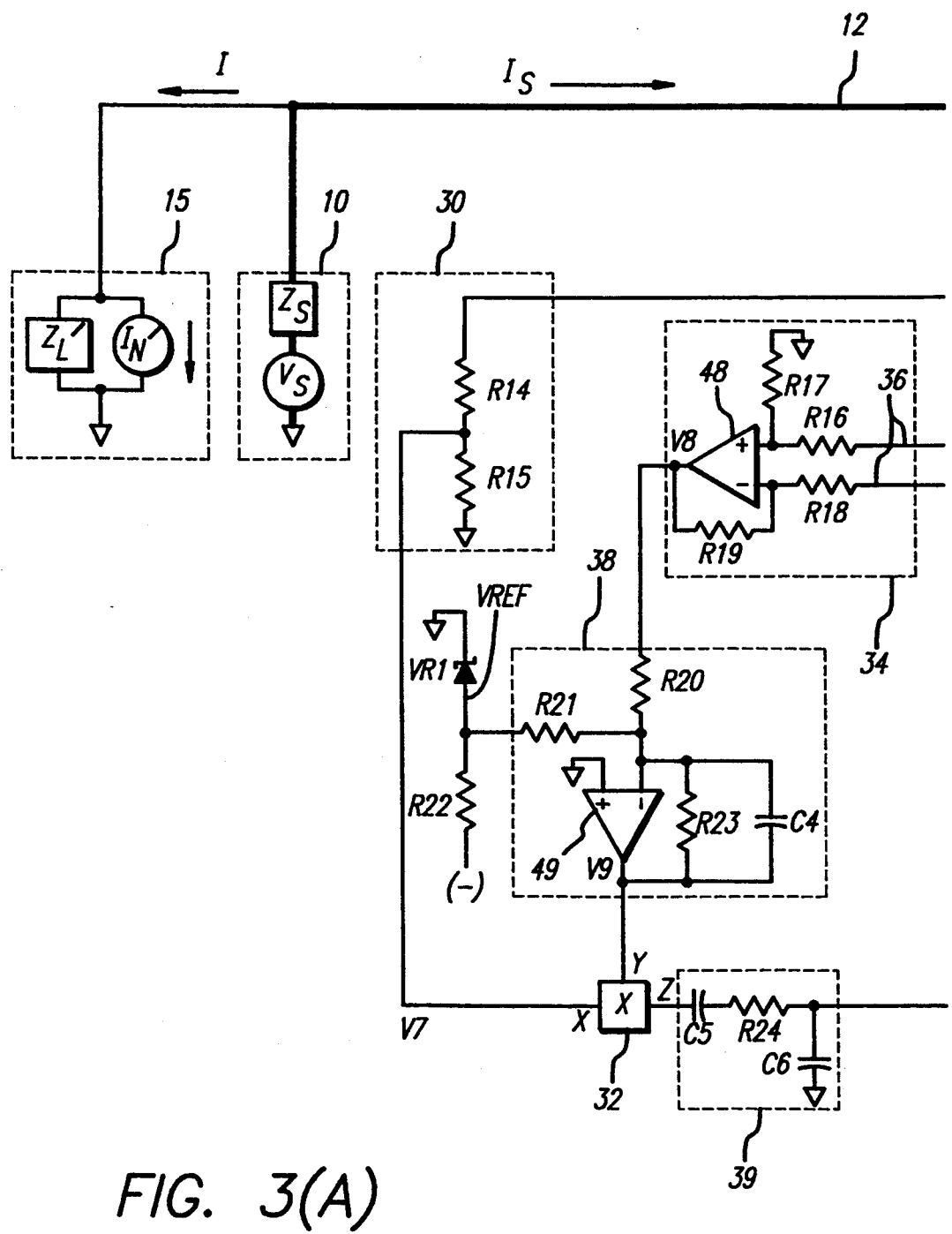
FIG. 3 is a more detailed schematic diagram illustrating the circuit of FIG. 2.
Figure 3B:
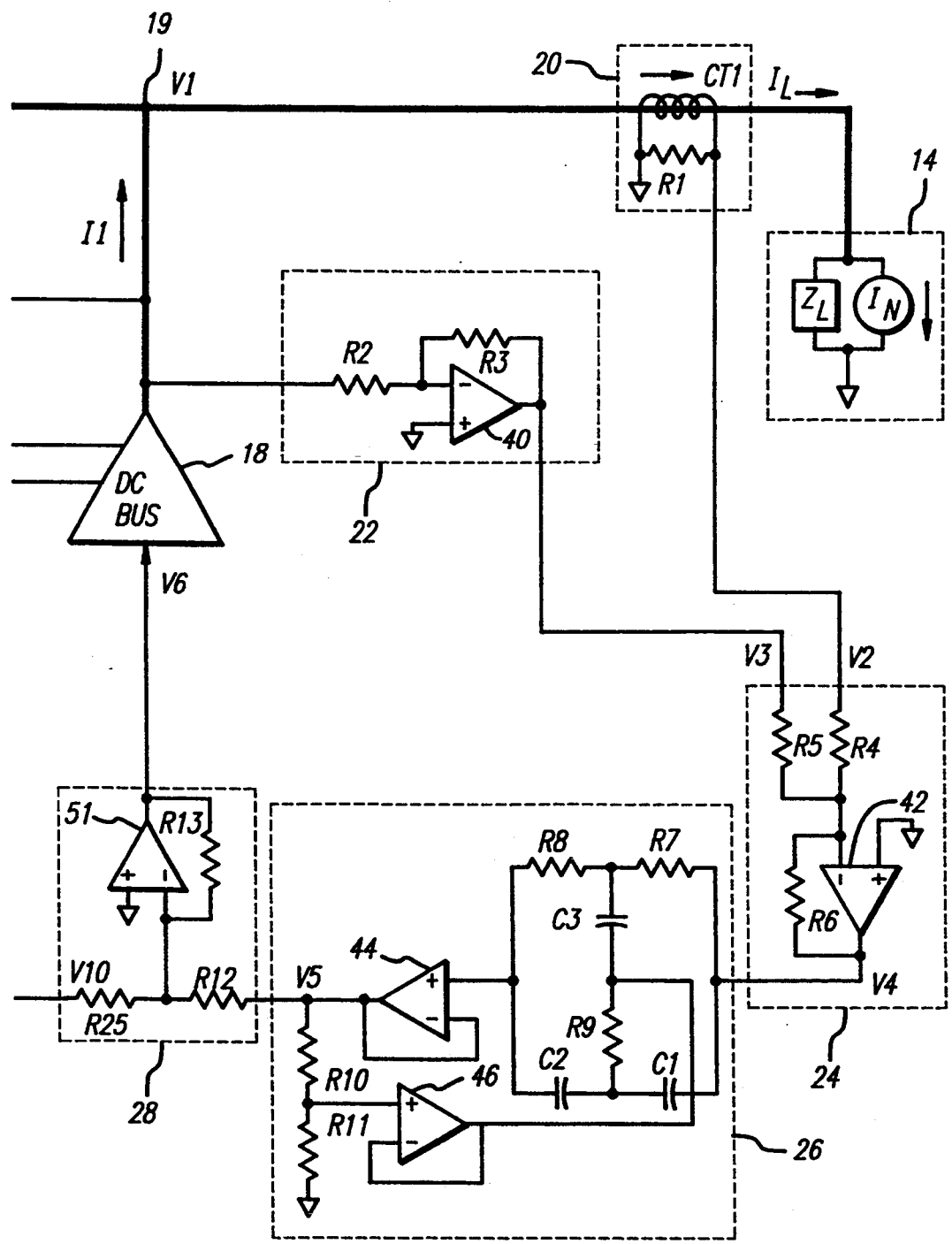

FIG. 3 is a more detailed schematic diagram of one embodiment of the invention. The current sensing transducer 20 uses a current transformer CT1 and a burden resistor R1 to provide the voltage V2 which is proportional to the load current $I_L$. The first voltage sensing circuit 22 comprises an operational amplifier 40 with gain resistors R2 and R3 connected to provide a phase inversion and the desired amplitude of voltage sensing signal V3. The summing junction 24 comprises an operational amplifier 42 and resistors R4, R5, and R6 to provide the output signal V4 equal to $-V2-V3$ (V4=−V2−V3). The notch filter 26 comprises, in this embodiment, a "twin-T" type filter comprising resistors R7 through R9 and capacitors C1 through C3 feeding a buffer amplifier 44 to produce output voltage V5. The notch filter 26 is made sharper in this embodiment by the use of positive feedback through resistor divider R10 and R11, and the buffer amplifier 46 to the "T" element of the twin-T circuit.

The second voltage sensing circuit 30 comprises divider resistors R14 and R15 to provide a voltage V7 to the "X" input of the analog multiplier 32. The DC bus sensing circuit 34 comprises an operational amplifier 48 and gain resistors R16 through R19 to produce the voltage V8. The difference between the voltage V8 and the reference voltage $V_{ref}$ as determined by zener diode VR1 biased by R22 is amplified by the operational amplifier 49 in conjunction with gain resistors R20, R21, and R23 and frequency response capacitor C4 to result in error voltage V9. The output at the "Z" port of the analog multiplier 32 is therefore voltage V7 adjusted in amplitude or polarity by error voltage V9 applied at the "Y" input of the analog multiplier 32. The output voltage at the "Z" port of the analog multiplier 32 is filtered by a band pass filter 39 comprising a resistor R24 and capacitors C5 and C6 to produce control signal V10, which is thus proportional to the fundamental frequency component of the voltage V1 on the AC power line 12.

The summing junction 28 feeding the transconductance amplifier 18 receives the voltage V10 from the band pass filter 39, applies it through resistor R25 to the negative input terminal of an operational amplifier 51. Also provided to the negative input terminal of the operational amplifier 51 is the output voltage V5 from the notch filter 26. Voltage V5 is applied through resistor R12. Control signal V6 to the transconductance amplifier 18 is therefore equal to $-V5-V10$ (V6=−V5−V10). Resistor R13 is a gain control resistor.

Figure 4:
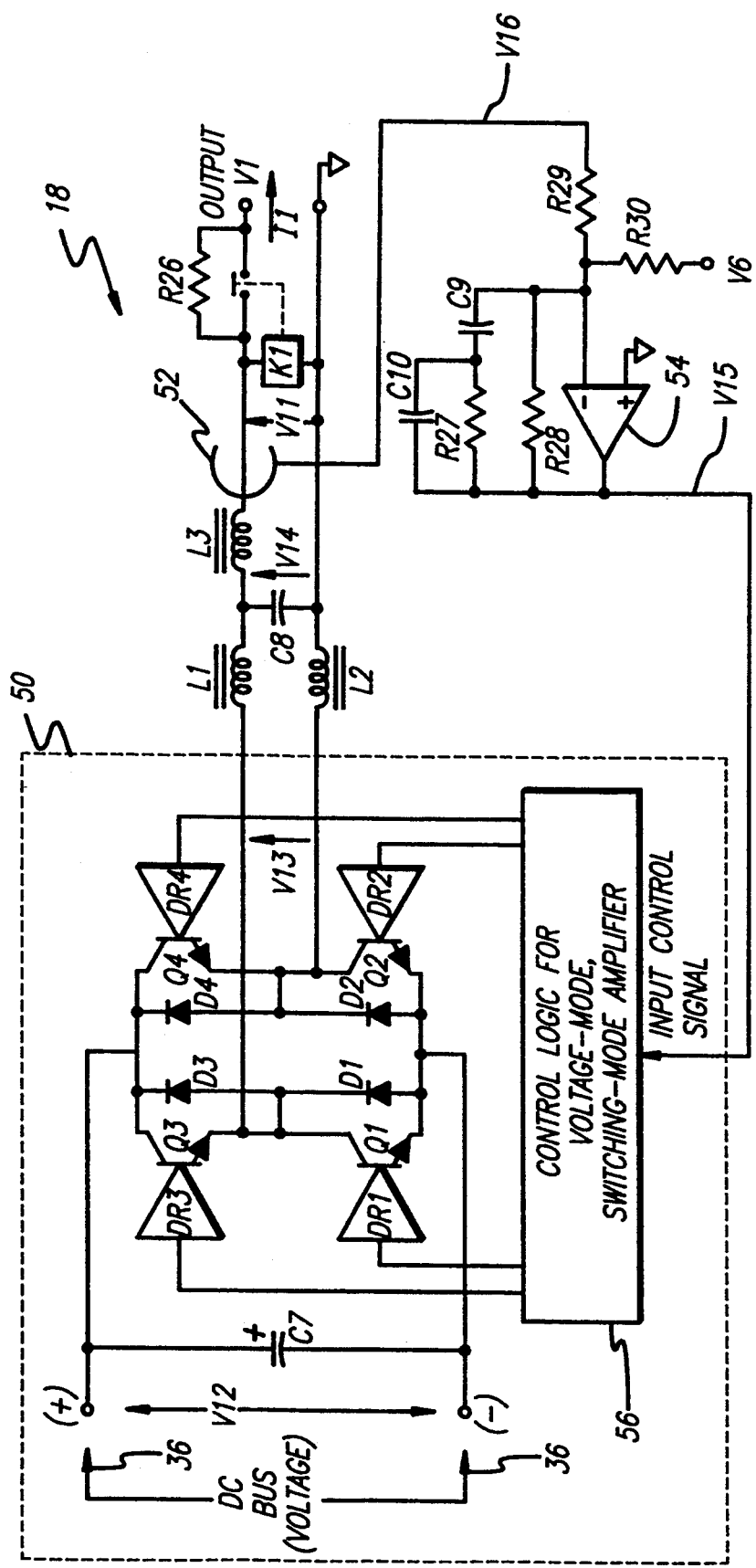
FIG. 4 is a schematic diagram illustrating one embodiment of a transconductance amplifier using a voltage-mode, switching-mode amplifier and internal current feedback control.

FIG. 4 is a schematic diagram showing one possible circuit implementation for the transconductance amplifier 18. The transconductance amplifier 18 of FIG. 4 is a hi-directional device between its AC output and DC bus ports. A voltage-mode, switching-mode amplifier 50 is used in conjunction with a series inductor L3 to produce the desired output current. Output current control is provided by a current feedback control loop comprising primarily a current sensor 52 and a feedback control amplifier 54. The switching-mode amplifier 50, also called a class D amplifier (voltage mode), is based on the circuit described in U.S. Pat. No. 4,020,361 to Suelzle et al. incorporated herein by reference.

The switching-mode amplifier 50 comprises semiconductor power switches Q1 through Q4 with diodes D1 through D4 and drive circuits DR1 through DR4 arranged in an H-bridge configuration. The DC voltage bus 36, at voltage V12, is supported for AC currents by capacitor C7. The three-state switched voltage waveform V13 from the H-bridge is filtered by inductors L1 and L2 and by capacitor C8 to remove the switching frequency, e.g. 50 kHz, from the voltage V14 across the capacitor C8. The control logic circuitry 56 receives analog input control voltage V15 and generates the appropriate switching control signals, such as those described in U.S. Pat. No. 4,020,361, so that V14 is proportional to V15, the input control signal to amplifier 50.

When AC power line voltage V1 is initially applied, the DC bus 36 capacitor C7 is charged through the "soft-start" resistor R26, the inductors L1 through L3, and the diodes D1 through D4. As the capacitor C7 charges, the AC voltage V11 will rise. When the voltage V11 reaches approximately 80% of the AC power line voltage V1, a contactor K1 will be energized thereby short-circuiting the soft-start resistor R26.

The voltage across the inductor L3, V 14 −V11, produces output current I1. Current sensor 52, a Hall current sensor for example, provides voltage V16 which is proportional to current I1 but opposite in phase. Voltage V16 is compared to voltage V6 through gain control resistors R29 and R30 respectively, the input control signal to the transconductance amplifier 18, at amplifier 54 to provide output current feedback correction signal V15. Output current I1 is thereby made proportional to the analog control signal V6, the desired transconductance amplifier 18 characteristic. The resistors R27 and R28 and the capacitors C9 and C10 are selected to provide a stable operation of the current control feedback loop.

In the case where the voltage on the AC power line includes non-fundamental frequency components, the control signal V6 will cause the transconductance amplifier 18 to appear resistive to the source 10 at the non-fundamental frequency components and current at these non-fundamental frequencies will flow into the transconductance amplifier. The power drawn at these frequencies will charge the DC bus capacitor C7 as controlled by $V_{ref}$. If the power flowing into the amplifier 18 at these non-fundamental frequencies is sufficient in itself to operate the active filter 16 mid keep C7 charged to the voltage set by $V_{ref}$, then control signal V10 will not cause any power to be drawn from the AC power line 12 at the fundamental frequency $f_o$. If the power flowing into the amplifier 18 at the non-fundamental frequencies exceeds the power required to support the internal losses of the active filter, the transconductance amplifier will, in response to control signal V10, cause sufficient current and consequent power to flow to the AC power line 12 at the fundamental frequency to maintain the voltage across C7 at the value set by $V_{ref}$. This current will then be available for use by other loads 15 connected to the AC power source 10.

Figure 5A:
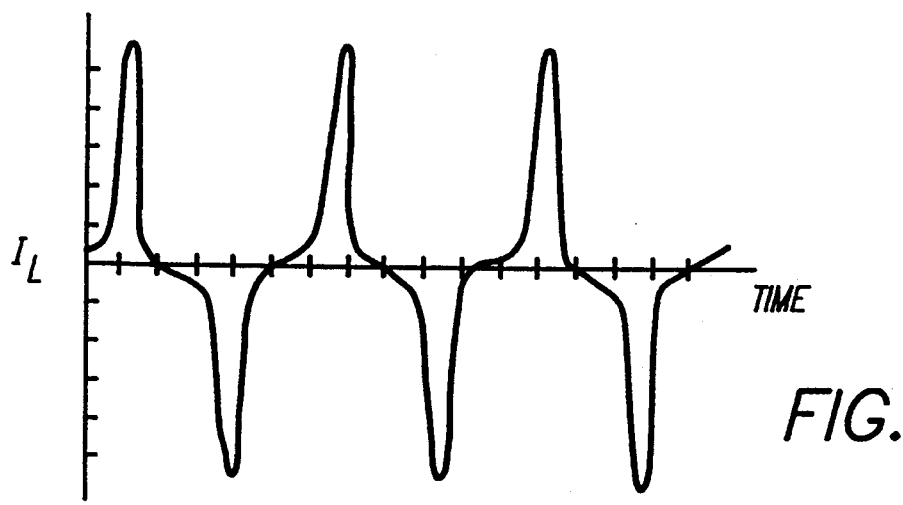
FIGS. 5A through 5C present examples of current waveforms.
Figure 5B:
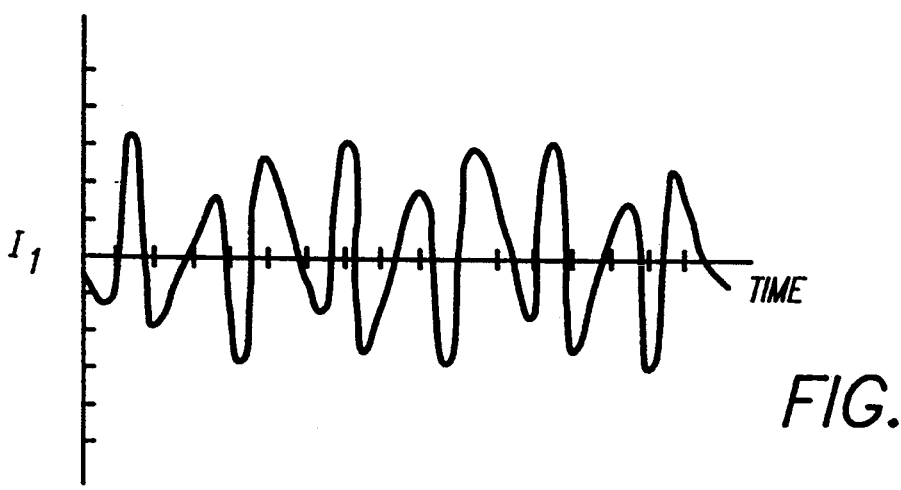
Figure 5C:
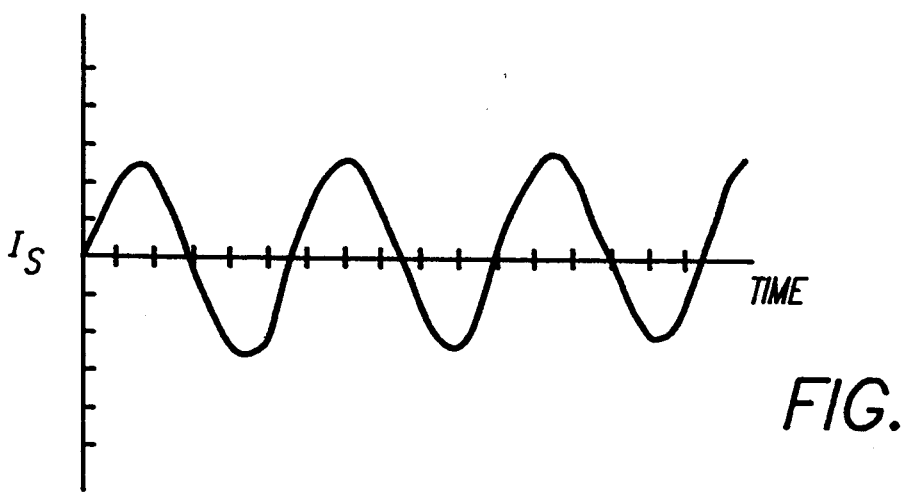

FIG. 5 depicts current waveforms measured on a prototype embodying the principles of the invention. The vertical and horizontal scales are twenty amperes per division and two milliseconds per division, respectively. FIG. 5A shows the load current $I_L$ drawn by a nonlinear and linear load combination. The nonlinear portion, exemplified by the highly-peaked current component, is typical of the current drawn by electronic equipment such as personal computers. FIG. 5B shows the current I1 injected by the active filter in accordance with the invention. FIG. 5C shows the current $I_s$ provided by the AC power source which results from the beneficial effects of an active filter embodying the principles of the invention. The harmonic current components of the load current $I_L$ are substantially absent from the source current $I_s$. The harmonics in the source voltage waveform caused by those harmonic load currents are consequently substantially attenuated.

The active filter as described above and shown in the figures connects to a single-phase AC power line and uses load-current sensor 20. For poly-phase applications, such as four-wire and three-wire, three-phase systems, multiple active filters can be employed. For a three-phase, four-wire system three active filters can be employed. Each would connect between one of the "hot" lines, usually designated "A, " "B, " or "C" and the neutral conductor. The load current sensor 20 would connect to the corresponding A, B or C load circuit. For a three-wire, three-phase power system, two active filters can be employed. In this case, one of the three conductors, "C" for example, would be used for the common connection of both devices. The "hot" connections and load current monitoring would be made to conductors A and B, respectively. It should be noted that because the sum of the three line currents is zero in the 3-wire system, the removal of non-fundamental frequency current components from the A-phase and B-phase power source currents results in the removal of such components front the C-phase power source current.

Referring again to FIG. 2, the operation of the active filter will be described. The current sensor 20 will provide to the junction 24 a voltage representative of the sensed current waveform of the current $I_L$ drawn by the load 14. The first voltage sensing circuit 22 will sense the voltage on the AC power line 12 and will provide a voltage representative of that sensed voltage to be combined at the junction 24 with the voltage representative of the current $I_L$ sensed. The combination of the two voltages is then filtered by a notch filter 26 to remove the fundamental frequency, e.g. 60 Hz. The resulting signal V5 is combined with V10 and is fed to the transconductance amplifier 18. The result of combining the filtered voltage sense signal V3 and the filtered current sense signal V2 is that the transconductance amplifier 18 supplies to the AC power line 12 the non-fundamental components of load current $I_L$ less the non-fundamental frequency current that would flow into a predetermined resistive load as the result of the non-fundamental frequency components of the voltage on the AC power line. This predetermined resistive load value could, for example, be selected to approximate the nominal "full load" resistance of the load circuit.

As an example, if them were no distortion in the AC power line voltage, the transconductance amplifier 18 would provide all of the non-fundamental frequency current drawn by the load and no non-fundamental frequency current would be drawn from the AC power source 10.

As a second example, if the load 14 were an open circuit (no load) and the line voltage V1 contained non-fundamental frequency voltage components, non-fundamental frequency current proportional to non-fundamental frequency components of voltage-sense signal V3 would flow into the transconductance amplifier 18 from the AC power line 12. In other words, for non-fundamental frequency voltage components of AC power line voltage V1, the active filter functions as a dissipating resistor of predetermined value connected to AC power line 12. The non-fundamental frequency power flowing into the active filter is available to support some portion of the active filter's internal losses. If the flow of non-fundamental frequency power into the active filter were to exceed the internal losses, the excess power would be returned to the AC power source 10 in the form of power at the fundamental frequency.

As a third example, if the line voltage V1 contained non-fundamental voltage components and the load were resistive and equal to the predetermined resistive load value of the active filter, the non-fundamental frequency components of voltage sense signal V3 and the non-fundamental frequency components of current sense signal V2 would cancel one another, and, with the exception of a small amount of current drawn by the active filter in response to control signal V10 to compensate for internal losses, no current would flow between the AC power line 12 and the active filter.

Although specific embodiments of the invention have been described and illustrated it is clear that the invention is susceptible to numerous modifications and embodiments within the ability of those skilled in the art, and without the exercise of the inventive faculty. Thus, it should be understood that various changes in form, detail and application of the present invention may be made without departing from the spirit and scope of the invention.

We claim:

1. An active filter connected to a power line between a power source providing power at a fundamental frequency and a load, the active filter comprising:
   current sensing means connected to the power line for sensing the current flowing to the load and providing a current sense signal representative of the sensed current;
   voltage sensing means connected to the power line for sensing the voltage on the power line and for providing a voltage sense signal representative of the sensed voltage;
   filtering means for filtering the fundamental frequency out of the current sense signal and for filtering the fundamental frequency out of the voltage sense signal; and
   current generating means for providing a first current to the power line in response to the filtered current sense signal and a second current to the power line in response to the filtered voltage sense signal.

2. The active filter of claim 1 wherein the first current is substantially in phase with non-fundamental frequency current components on the power line sensed by the current sensing means.

3. The active filter of claim 1 wherein the second current is out of phase with non-fundamental frequency voltage components on the power line sensed by the voltage sensing means.

4. The active filter of claim 3 further comprising power supply means for receiving the second current and providing power to operate the current generating means from said second current.

5. The active filter of claim 1 wherein:
   the first current is in phase with non-fundamental frequency current components on the power line sensed by the current sensing means; and
   the second current is of opposite phase to non-fundamental frequency voltage components on the power line sensed by the voltage sensing means.

6. The active filter of claim 1 wherein the current generating means provides the first and second currents to the power line farther from the load than the point on the power line at which the current sensor means senses the power line current.

7. The active filter of claim 1 wherein the current generating means provides the first and second currents to the power line at the same point at which the voltage sensing means senses the voltage on the power line.

8. The active filter of claim 1 further comprising a combiner coupled to the current sensing means and the voltage sensing means to receive the current sense signal and the voltage sense signal, the combiner provides a control signal which is a combination of the current sense signal and the voltage sense signal;
   wherein the filtering means comprises a filter coupled to the combiner which filters the fundamental frequency from the control signal; and
   wherein the current generating means is responsive to the filtered control signal to provide the first and second currents.

9. The active filter of claim 1 further comprising power supply means connected to the power line for receiving power from the power line to operate the current generating means including providing power to the current generating means from which the current generating means generates the first and second currents.

10. The active filter of claim 9 wherein the current generating means is also for supplying a third current to the power line when the power supplied to the current generating means by the power supply means exceeds the power required by the current generating means for its operation, the third current being at the fundamental frequency.

11. An active filter connected to a power line between a power source providing power at a fundamental frequency and a load, the active filter comprising:
   a current sensor connected to the power line which provides a current sense signal proportional to the current on the power line;
   a voltage sensor connected to the power line which provides a voltage sense signal proportional to the voltage on the power line;
   a fundamental frequency filter which receives the current sense signal and the voltage sense signal, filters the fundamental frequency from the signals and provides a filtered current sense signal and a filtered voltage sense signal; and
   a current generator connected to the power line at a location closer to the power source than the current sensor and connected to the fundamental frequency filter and which provides a first current to the power line in response to the filtered current sense signal and a second current to the power line in response to the filtered voltage sense signal, the first and second currents being provided at the point at which the voltage sensor senses the voltage on the power line.

12. The active filter of claim 11 further comprising a combiner connected to the current sensor and to the voltage sensor and which combines the current sense signal with the voltage sense signal and provides a control signal representative of the combination;

wherein the filter receives the control signal and filters the fundamental frequency out of the control signal; and wherein the current generator receives the filtered control signal and provides the first and second currents to the power line in response thereto.

13. The active filter of claim 11 wherein the first current is equal to and is substantially in phase with non-fundamental frequency current components flowing to the load on the power line.

14. The active filter of claim 13 wherein the second current comprises a current proportional to and out of phase with non-fundamental frequency voltage components on the power line sensed by the voltage sensor.

15. The active filter of claim 14 further comprising a power supply which receives the second current and provides power to operate the current generator from the second current.

16. The active filter of claim 11 further comprising a power supply circuit connected to the power line which receives power from the power line to operate the current generator including providing power to the current generating means from which the current generating means generates the first and second currents.

17. The active filter of claim 16 wherein the current generator also supplies a third current to the power line when the power supplied to the current generator by the power supply circuit exceeds the power required by the current generator for its operation, the third current being at the fundamental frequency.

18. A method of providing current to a power line connected between a power source providing power having a fundamental frequency and a load, comprising the steps of:

sensing the current on the power line flowing to the load and providing a current sense signal representative of the sensed current;

sensing the voltage on the power line and providing a voltage sense signal representative of the sensed voltage;

filtering the fundamental frequency from the current sense signal and from the voltage sense signal; and injecting a first current into the power line in response to the filtered current sense signal and injecting a second current into the power line in response to the filtered voltage sense signal.

19. The method of claim 18 wherein the step of injecting a first current comprises injecting a first current which is substantially in phase with non-fundamental frequency current components on the power line.

20. The method of claim 18 wherein the step of injecting a second current comprises injecting a second current which is out of phase with non-fundamental frequency voltage components on the power line.

21. The method of claim 20 further comprising the step of generating the first current from the second current.

22. The method of claim 18 wherein the step of injecting the first and second currents to the power line comprises the step of injecting the first and second currents to the power line at a point located farther from the load than the point on the power line at which the current is sensed.

23. The method of claim 18 wherein the step of injecting the first and second currents to the power line comprises the step of injecting said currents at the same point at which the voltage on the power line is sensed.

24. The method of claim 18 further comprising the step of combining the current sense signal and the voltage sense signal prior to the step of filtering and providing a control signal from said combination;

wherein the step of filtering comprises the step of filtering the fundamental frequency from the control signal; and wherein the step of injecting first and second currents comprises the step of injecting first and second currents in response to the filtered control signal.

25. The method of claim 18 further comprising the steps of receiving power from the power line and forming the first and second currents from said received power.

26. The method of claim 25 further comprising the step of supplying a third current to the power line when the power received from the power line for forming the first and second currents exceeds the power required to form said first and second currents, the third current being at the fundamental frequency.

* * * * *